(12) United States Patent
Thomas

(10) Patent No.: US 12,188,427 B2
(45) Date of Patent: Jan. 7, 2025

(54) ADJUSTING AN INTERNAL COMBUSTION ENGINE

(71) Applicant: Cummins Inc., Columbus, IN (US)

(72) Inventor: Robert J. Thomas, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/513,958

(22) Filed: Nov. 20, 2023

(65) Prior Publication Data

US 2024/0084756 A1 Mar. 14, 2024

Related U.S. Application Data

(63) Continuation of application No. PCT/US2022/072700, filed on Jun. 2, 2022.

(60) Provisional application No. 63/196,807, filed on Jun. 4, 2021.

(51) Int. Cl.
*F02D 41/00* (2006.01)
*F02D 41/24* (2006.01)

(52) U.S. Cl.
CPC ..... *F02D 41/2454* (2013.01); *F02D 41/0027* (2013.01)

(58) Field of Classification Search
CPC ............. F02D 41/2454; F02D 41/0027; F02D 19/0634; F02D 19/0613; F02D 19/029; Y02T 10/30
See application file for complete search history.

(56) References Cited

U.S. PATENT DOCUMENTS

| 4,905,649 | A | * | 3/1990 | Washino | F02D 35/023 |
| | | | | | 73/114.38 |
| 5,381,767 | A | | 1/1995 | Kikuchi | |
| 5,526,645 | A | * | 6/1996 | Kaiser | F02D 23/02 |
| | | | | | 60/611 |
| 5,622,053 | A | * | 4/1997 | Freen | F02B 29/0412 |
| | | | | | 123/434 |

(Continued)

FOREIGN PATENT DOCUMENTS

| DE | 102019200408 | 7/2020 |
| WO | 2017135957 | 8/2017 |
| WO | 2017184492 | 10/2017 |

OTHER PUBLICATIONS

International Search Report and Written Opinion, PCT Appln. No. PCTUS22072700, filed Jun. 2, 2022, mailed Nov. 21, 2022, 21 pgs.

*Primary Examiner* — Phutthiwat Wongwian
*Assistant Examiner* — Sherman D Manley
(74) *Attorney, Agent, or Firm* — Taft, Stettinius & Hollister LLP

(57) ABSTRACT

A computer system includes a processor and a memory configured with instructions executable by the processor to determine a fuel configuration in response to input received by the HMI, determine fuel composition constituents in response to at least the fuel configuration, determine one or more fuel properties in response to at least one or more fuel composition constituents, determine one or more engine controller adjustments in response to the one or more fuel properties, and provide the one or more adjustments to an engine control system. A human-machine interface (HMI) is operatively coupled with the processor, and a memory and may be utilized to provide commissioning or service inputs.

21 Claims, 12 Drawing Sheets

(56) References Cited

U.S. PATENT DOCUMENTS

| | | | |
|---|---|---|---|
| 8,813,690 B2* | 8/2014 | Kumar | F02D 19/088 |
| | | | 60/274 |
| 9,790,883 B2* | 10/2017 | Rebinsky | F02D 19/029 |
| 11,306,669 B1* | 4/2022 | Gallmeyer | F02D 41/1461 |
| 2013/0046451 A1* | 2/2013 | Suzuki | F02D 35/023 |
| | | | 701/102 |
| 2015/0377161 A1 | 12/2015 | Smith | |
| 2016/0258379 A1* | 9/2016 | Rasmussen | F02D 19/0642 |
| 2017/0218837 A1* | 8/2017 | Zhong | F02B 43/12 |

* cited by examiner

ADJUSTING AN INTERNAL COMBUSTION ENGINE

CROSS-REFERENCE TO RELATED APPLICATIONS

This application is a continuation of International PCT Application No. PCT/US2022/72700 filed on Jun. 2, 2022, which claims priority to U.S. Provisional Application No. 63/196,807 filed on Jun. 4, 2021, which are incorporated herein by reference in their entirety for all purposes.

BACKGROUND

The present application relates generally to adjusting an internal combustion engine and more particularly, but not exclusively, to the commissioning, service and maintenance adjustment, and in-service adjustment (e.g., adjustment initiated by commissioning or service personnel or automated in-operation adjustment) of combustion and fuel control systems of a spark-ignited gaseous fueled engine and related engine controls, calibrations, and interfaces. Conventional approaches to configuring, commissioning, servicing, maintaining, and controlling internal combustion engines suffer from a number of drawbacks, limitations, and shortcomings. Such approaches may be limited to an assumed fuel composition or a limited range of fuel compositions. Such approaches are typically difficult to commission and may require a control system calibration developed for the specific composition or compositions of fuel expected to be supplied to the engine. Such approaches may require extensive engineering support to determine acceptable settings based on the available fuel composition information from the site due to the nature of the required adjustments. Such approaches result in a proliferation of the number of control system calibrations created and released to support emissions requirements and settings. There remains a significant unmet need for the unique apparatuses, methods, systems, and techniques disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art.

SUMMARY OF THE DISCLOSURE

One embodiment is a unique computer system for adjusting operation of an internal combustion engine in response to characteristics of gaseous fuel provided to, or to be provided to the engine and/or configurations and/or adjustments related to features such as emissions targets, emissions control modes, start assist, warm-up assist, emissions adjustment, reset interfaces, and other features. Another embodiment is a unique computer-implemented process for adjusting operation of an internal combustion engine in response to characteristics of gaseous fuel provided to, or to be provided to the engine and/or configurations and/or adjustments related to features such as emissions targets, emissions control modes, start assist, warm-up assist, emissions adjustment, reset interfaces, and other features. Further embodiments, forms, objects, features, advantages, aspects, and benefits shall become apparent from the following description and drawings.

DETAILED DESCRIPTION OF EXAMPLE EMBODIMENTS

Figure 1:
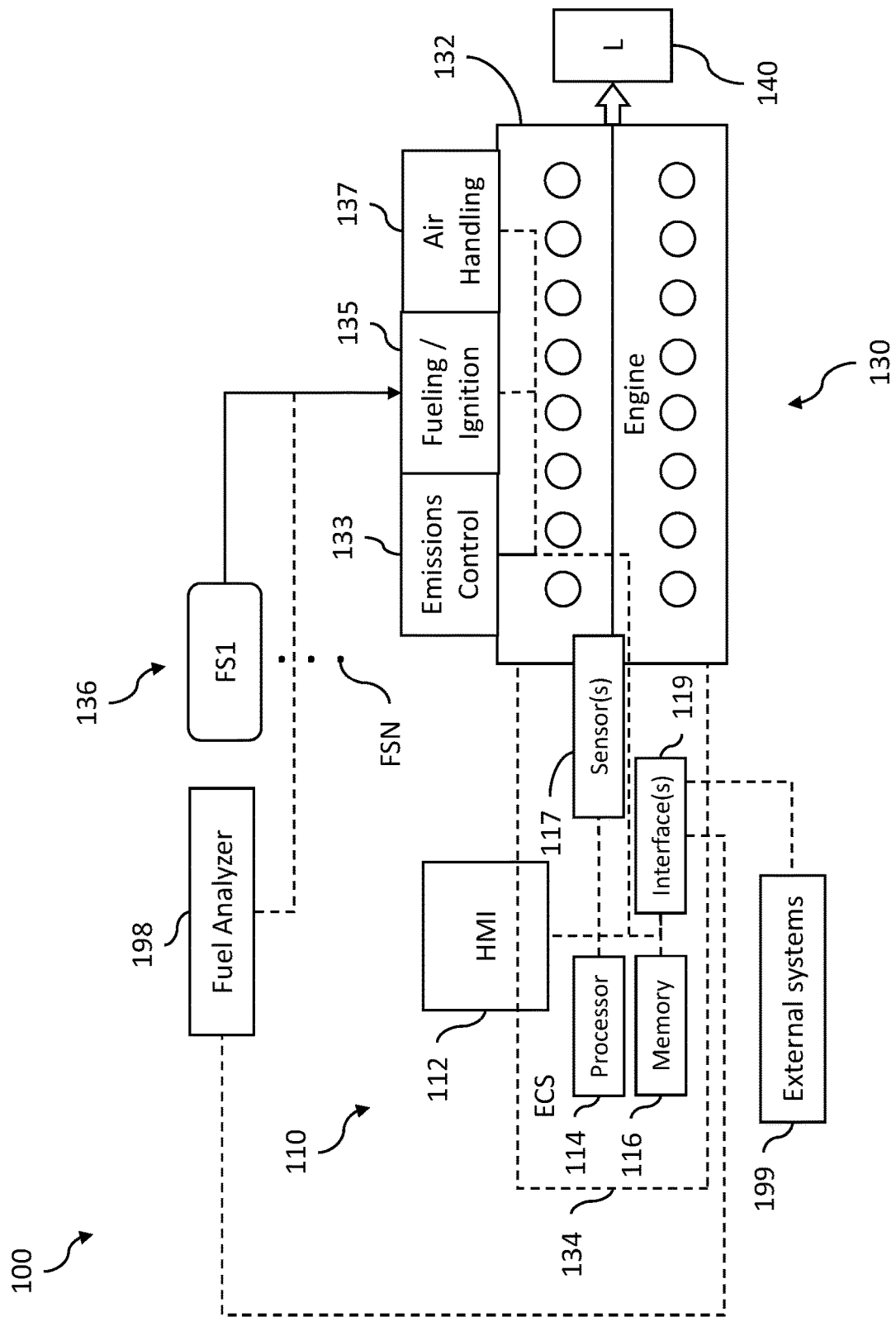
FIG. 1 is a schematic diagram illustrating certain aspects of an example system according to the present disclosure.

With reference to FIG. 1, there is illustrated a system 100 comprising a computer system 110 and an engine system 130. In the illustrated form, the computer system 110 comprises an electronic control system (ECS) 134 in operative communication with a human-machine interface (HMI) 112. The ECS 134 comprises a processor 114, a non-transitory memory medium 116, a sensor system 117 including one or more sensors, and an interface system 119 including one or more machine interfaces. It shall be appreciated that the HMI 112 may be dedicated or native to the ECS 134, may be selectable connectable with the ECS 134 (e.g., by a cable, datalink, or other communication interface or equipment), or may be in operative communication with the ECS 134 from a remote location (e.g., via one or more networks).

The ECS 134 executes operating logic that defines various control, diagnostic, management, and/or regulation functions. For example, the non-transitory memory medium 116 may be configured with instructions executable by the processor 114 to perform a number of acts or operations including the acts described herein. The operating logic of ECS 134 may be in the form of dedicated hardware, such as a hardwired state machine, analog calculating machine, programming instructions, and/or a different form as would occur to those skilled in the art.

While depicted as single units in the illustrated example, it shall be appreciated that the processor 114, the non-transitory memory medium 116, the sensor system 117, and the interface system 119 may be provided as or distributed across or among multiple units or physical packages. For example, while a single processor 114 is depicted in FIG. 1, the ECS 134 may comprise a plurality of processors, such as programmable microprocessors or microcontrollers of a solid-state, integrated circuit type which may be provided in a plurality of control units and can be implemented in any of a number of ways that combine or distribute the control function across one or more control units in various manners. Additionally, two or more of the processor 114, the HMI 112, the non-transitory memory medium 116, the sensor system 117, and the interface system 119 may be provided, in whole or in part, in a common unit or physical package or distributed across or among multiple units or physical packages. Other components or subsystems of the computer system 110 and/or ECS 134 may also be so configured or provided. Furthermore, the ECS 134 may itself be provided as or distributed across or among multiple units or physical packages which may include duplicative instances of the constituent features of ECS 134, and various ones of the units or packages may be provided in on-engine forms or off-engine forms.

As indicated above, the ECS 134 may be provided as a single component or a collection of operatively coupled components and may be comprised of digital circuitry, analog circuitry, or a hybrid combination of both of these types. When of a multi-component form, the ECS 134 may have one or more components remotely located relative to the others in a distributed arrangement. The ECS 134 can include multiple processing units arranged to operate independently, in a pipeline processing arrangement, in a parallel processing arrangement, or the like. It shall be further appreciated that the ECS 134 and/or any of its constituent processors or logic components may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, datalinks, networks, communication interfaces, delay devices, memory devices, Analog to Digital (A/D) converters, Digital to Analog (D/A) converters, and/or different circuitry or components as would occur to those skilled in the art to perform the desired communication, computation, conditioning, processing, and other operations.

The HMI 112 may be provided in a number of forms providing a commissioning and service interface through which commissioning or service personnel can view or access information from the computer system 110 and/or enter information into the computer system 110. In some forms, the HMI 112 may be provided in one or more stand-alone computers such as a desktop, laptop, smartphone, or tablet computer which may be configured to implement and provide a commissioning and/or service tool and which may be selectably connectable to and disconnectable from (physically and/or operatively) the ECS 134 and/or the engine system 130. In some forms, for example, the HMI 112 may be remotely located and operatively connectable to and disconnectable from the ECS 134 via one or more networks or datalinks. In some forms, the HMI 112 may be dedicated to or specifically adapted to interface with the engine system 130 and may be physically tied to or operatively dedicated or limited to interaction or interfacing with the engine system 130 such as a touch-screen or a monitor with an associated manual input device. It shall be appreciated that the HMI may be provided or present in multiple computer systems, which may be stand-alone computers or dedicated computer systems. Furthermore, in embodiments in which the HMI is removable or disconnectable from the engine system 130, the HMI may be provided or present during a commissioning or service event and thereafter removed. In some embodiments, HMI 112 may be implemented and provided as a combination of switches, momentary switches, selector switches, visual indications (e.g., lamps, LED), audible indications which may be provided in a hardwired interface, a panel interface, or the like.

The engine system 130 includes an internal combustion engine 132, a fueling and ignition system 135, and an air handling system 137, and in some embodiments may also include an emissions control system 133 which may include emissions or exhaust monitoring components and may also include exhaust aftertreatment components or systems, among other on-board or on-engine systems. The engine system 130 is operatively coupled with an electronic control system (ECS) 134 and is also operatively coupled with and configured to receive fuel from one or more fuel sources 136. In the illustrated example, the internal combustion engine 132 is provided as a reciprocating piston, spark-ignited engine configured to combust gaseous fuel from one or more fuel sources 136. In other examples, the internal combustion engine 132 may be configured as another type of engine, such as a dual fuel engine configured to selectably combust at least one gaseous fuel and another type of fuel, such as a diesel fuel, a liquid petroleum fuel, or another type of fuel. In the illustrated example, the one or more fuel sources 136 comprise at least one source FS1 and may include a number of additional fuel sources as indicated by ellipsis FSN. The engine system 130 is configured to drive a load 140 which may be, for example, an electrical load such as a generator, a hydraulic load such as a fracking rig, a mechanical load such as a vehicle load, or another type of load. In some embodiments, the ECS 134 may be provided and configured to control or monitor load 140 or related systems, for example, the ECS 134 may include a generator set controller or generator set controls.

The sensor system 117 may include a number of sensors configured to sense various conditions or states of the engine or the engine system 130 and/or systems of or related to the load 140, such as, for example, one or more intake manifold pressure sensors, intake manifold temperature sensors, engine speed sensors, lambda sensors or engine exhaust gas $O_2$ sensors, NOx sensors, gaseous fuel flow sensors, fuel pressure sensors, and generator or genset sensors to name several examples. Such sensors may interface with and be configured to sense information of the condition or state of the engine 132, the emissions control system 133, the fueling and ignition system 135, the air handling system 137, other components or systems of or related to the engine system 130, and/or other components or systems of or related to the load 140.

The interface system 119 may include a number of machine interfaces providing communication with external sources and systems such as fuel analyzer 198 or other external systems or components 199. The fuel analyzer 198 is coupled with and is operable to output a signal indicating attributes of a fuel type being provided to the engine 132, for example, by sensing or monitoring fuel at a chamber, conduit, manifold, mixer, pipe, or plenum supplying fuel to the engine 132. In some embodiments, the fuel analyzer 198 may be similarly coupled with and operable to output a signal indicating attributes of a fuel type being provided to one or more additional engines which may be provided in a group with engine 132 and may share, in whole or in part, a common or related source or type of fuel or mixture thereof. The fuel analyzer 198 may be an infrared-type analyzer or another type of analyzer or sensor suitable for analyzing fuel composition as will occur to one of skill in the art with the benefit of the present disclosure. The fuel analyzer 198 may be directly coupled with the interface system 119 or may be coupled with the interface subsystem via one or more intermediate components, datalinks, devices, networks, or systems. The fuel analyzer 198 may be coupled and operable in connection with any of the fuel sources FS1 . . . FSn, individually or in combination. In some embodiments, the fuel analyzer 198 may be configured to provide in-operation or real-time methane percentage inputs or other sensed attributes of a fuel which may be utilized in the control features disclosed herein. One of the machine interfaces to interface system 119 may be a fuel characterization selection input signal from other external systems or components 199. The fuel characterization selection input may be indicative of one of multiple distinct switchable fuel sources 136 with potentially different fuel compositions configured as the source of fuel to engine 132.

In some embodiments, an indication of a selected physical fuel source may be annunciated by other external systems or components 199 to ECS 134 via the fuel characterization selection signal. In some embodiments, a fuel characterization selection input may be configured to provide in-operation or real-time indication of a discrete fuel source change which may be utilized in the control features disclosed herein. It shall be appreciated that the fuel analyzer 198 and/or a fuel characterization selection switch input that controls or selects its utilization in the controls disclosed herein may be omitted in certain embodiments, and may be present in other embodiments, such as those providing real-time automatic adjustments or diagnostics.

It shall be appreciated that system 100, including computer system 110 and engine system 130, provides one example of a system for which various acts and operations associated with or relating to the commissioning, maintenance or off-line service, or in-service adjustment of the combustion and fuel control system of a spark ignited gaseous fueled engine may be performed. Similarly, it shall be appreciated that the HMI 112 provides one example of an interface via which fuel information, engine start assist information, engine warm-up assist information, engine exhaust gas emissions information, reset information, and other types of information may be received, displayed, input, and/or provided to other components. It shall be further appreciated that the computer system 110 provides one example of a system configured and operable to automatically adjust the combustion and fuel control system in real-time in response to fuel composition changes.

Figure 2:
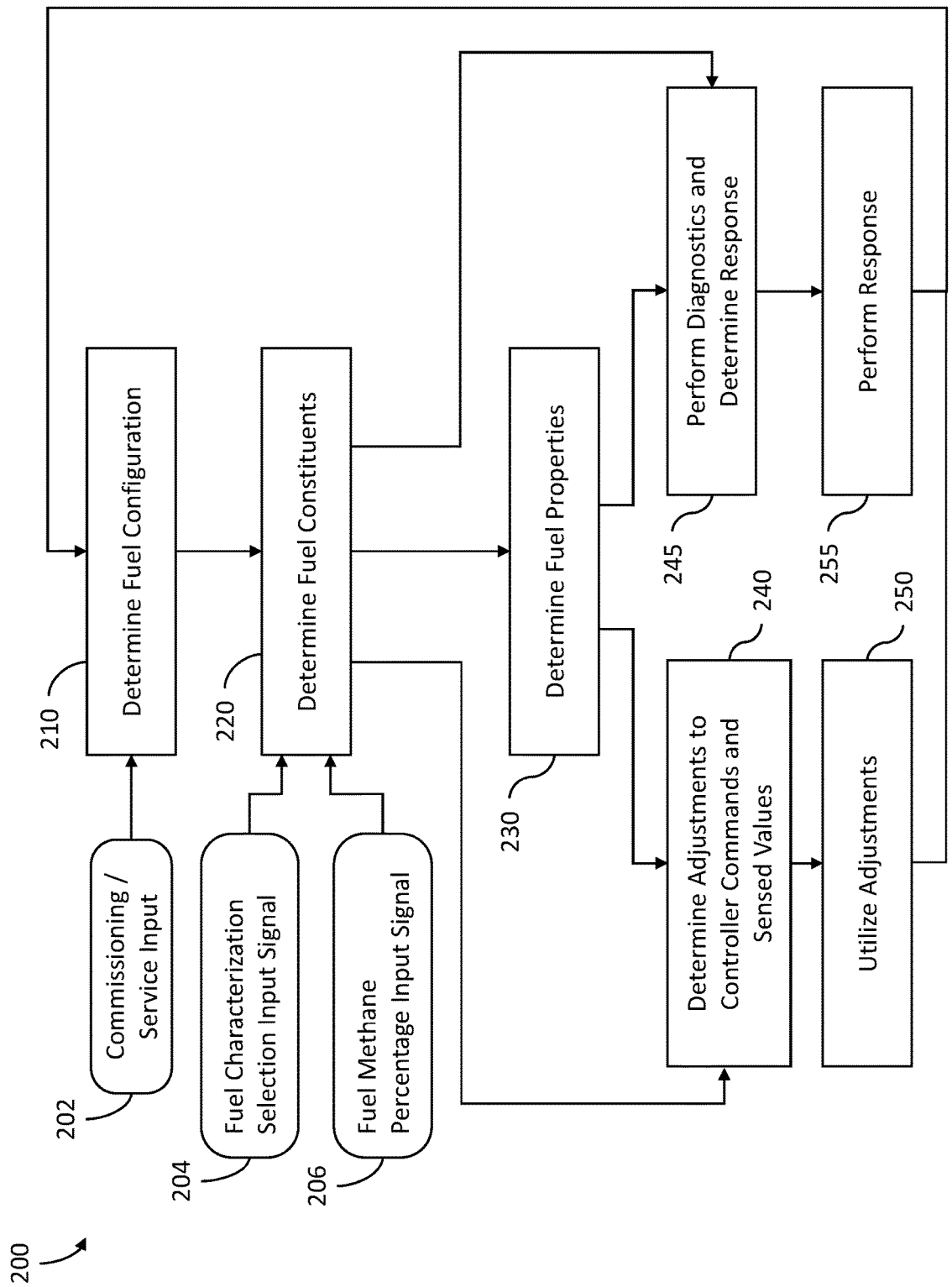
FIGS. 2-4 are flowcharts illustrating certain aspects of an example process according to the present disclosure.
Figure 3:
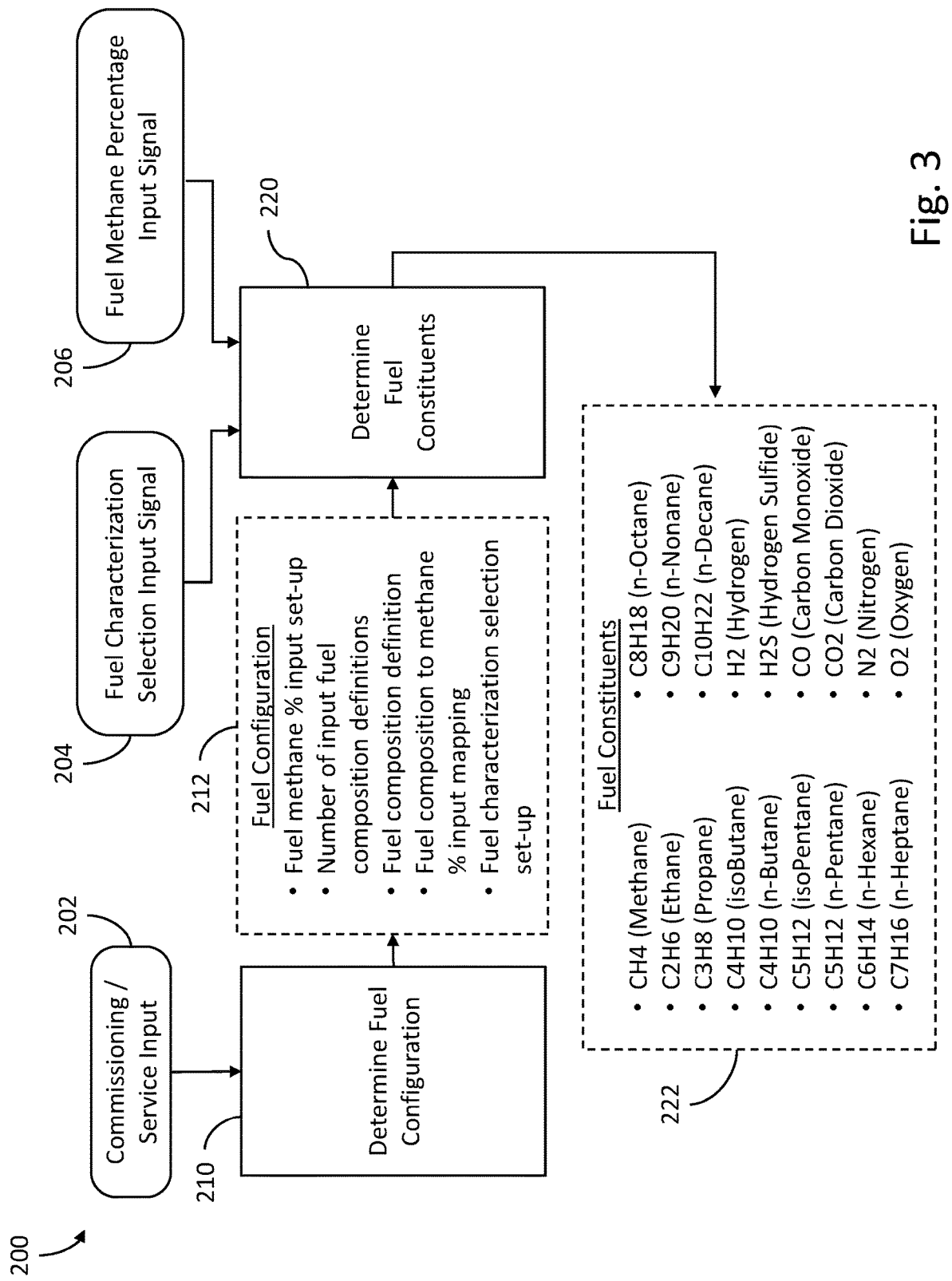
Figure 4:
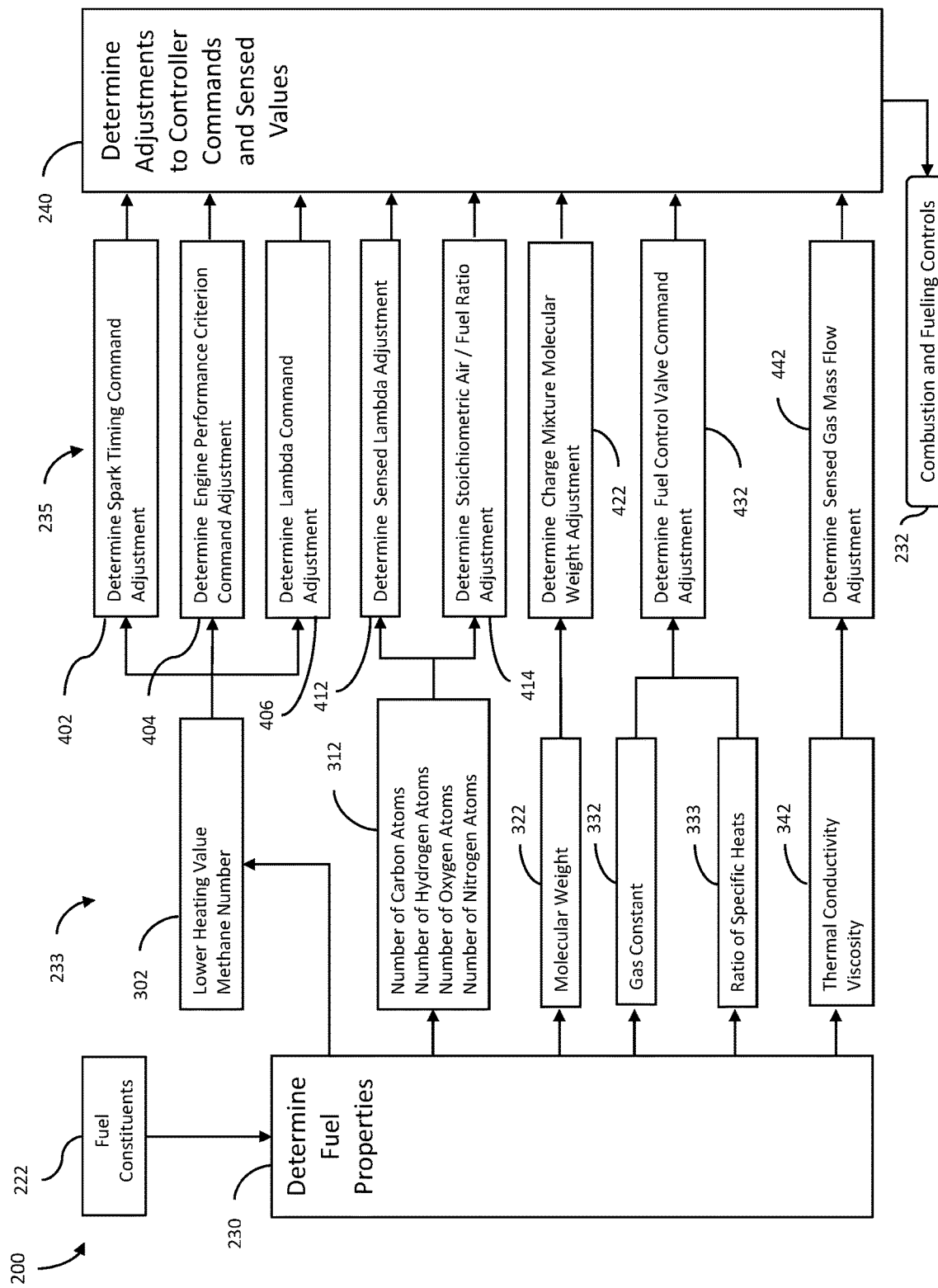

With reference to FIGS. 2-4, there is illustrated an example process 200 which may be implemented and performed, in whole or in part, in connection with a system such as system 100. In some forms, for example, the non-transitory memory medium 116 of the computer system 110 may be configured with instructions executable by the processor 114 to perform a number of acts, operations, or aspects of process 200. After being initiated or called, process 200 may perform operation 210 which determines fuel configuration information. In some embodiments and operating scenarios, the fuel configuration may be established by fixed values or by default, initial, or previously adjusted values. In such embodiments and operating scenarios operation 210 may determine the fuel configuration by accessing, calling, reading, referencing, or otherwise using the fixed, default, or initial values or previously adjusted values. In some embodiments and operating scenarios, the fuel configuration may be dynamically determined as adjusted, modified, or new values in response to input received via the HMI 112, such as commissioning/service input 202 which may be input to the HMI 112 by commissioning or service personnel during commissioning, service, maintenance, or operation or in-service adjustment of the system 100 and communicated from the HMI 112 to the processor 114 and the non-transitory memory medium 116. In such embodiments and operating scenarios, operation 210 may determine the fuel configuration by participating in the act of determining such values or by accessing, calling, reading, referencing, or otherwise using the new values. It shall be appreciated that as utilized herein terms such as determine, determining, determined and the like refer to and encompass a number of techniques and operations performed by a processer, controller, or other computing electronics device including, calculating, computing, conditioning, deciding, detecting, estimating, modeling, logically evaluating, looking up, pointing, referencing, remotely calling, reading from memory, selecting, sensing, and other techniques and operations as will occur to one of skill in the art with the benefit of the present disclosure.

The commissioning/service input 202 may comprise a number of types of information which may be based on knowledge of, information available to, and/or assumptions adopted by commissioning or service personnel. In response to the commissioning/service input 202, operation 210 determines fuel configuration information which may indicate at least one fuel source of the one or more fuel sources 136. The fuel configuration information may be provided in a number of forms such as fuel configuration information 212 which may comprise, for example, one or more of a fuel methane percentage input configuration or set-up, a number of input fuel composition definitions, a fuel composition definition configuration, a fuel composition to methane percentage input mapping, and a fuel characterization selection configuration. The fuel methane percentage input configuration or set-up may include a number of settings and information including an enable/disable setting, a hardwire/datalink input source setting, a fuel methane percentage to input current mapping/fuel methane percentage to input voltage mapping/datalink input source address mapping setting, a datalink broadcast enable setting. The number of input fuel composition definitions may be zero to five in some embodiments, although a greater number of definitions may be used in other embodiments. The fuel composition definition configuration may include a number of settings and information including a default/user-defined fuel composition setting, fuel constituents information, an assignment as input for methane analyzer input dependent definition, fuel composition definitions, fuel methane percentage input mapping information, and label information. The fuel characterization selection configuration may include a number of settings and information including a manual/automatic setting, manual selection information, a hardwire/datalink setting, a fuel characterization to selection input current mapping/fuel characterization to selection input voltage mapping/fuel characterization to selection input processed voltage (e.g., switch input state or selector discrete input state) mapping/datalink input source address mapping setting, and a datalink broadcast enable/disable setting.

From operation 210, process 200 proceeds to operation 220 which determines fuel composition constituents in response to at least the fuel configuration. The fuel composition constituents may indicate an absolute or relative amount (e.g., mass, volume, molarity, fractions such as mass fraction, volume fraction and mole fraction, percentages such as mass percentage, volume percentage and mole percentage, parts-per-million ("PPM") (which may pertain to mass, mole or volume parts) or other "parts-per" units or denominations, or other absolute or relative amounts) of at least one of a plurality of molecules or compositions. Operation 220 may utilize a number of approaches to determine a set of constituents representing the composition of the gaseous fuel supplied to the internal combustion engine 132. In a first approach, the fuel configuration from which fuel composition constituents may be determined may be set in the control system during manufacture, or pre-commissioning calibration of the system 100 and the fuel composition determined by the calibration settings may then be utilized as the input to subsequent calculations.

In a second approach, the fuel configuration from which fuel composition constituents may be determined may be entered by commissioning or service personnel at the time of commissioning or a subsequent service event via the HMI 112. The HMI 112 may provide a number of selectable and adjustable variables which the commissioning or service personnel may configure the system via inputs to the HMI 112. The fuel composition may be determined based on the fuel configuration information entered by commissioning or service personnel and may then be utilized as the input to subsequent determinations.

In a third approach, operation 220 may utilize a fuel characterization input signal 204 in determining fuel composition constituents. Input signal 204 may be provided via a machine interface such as a machine interface of interface system 119 a fuel analyzer, such as fuel analyzer 198 or another external source such as other external systems or components 199 coupled with a machine interface which may be, for example, a hardwire datalink or network shared among multiple units. Input signal 204 may be an analog signal such as voltage or current supplied via a hardwire interface or a digital datalink message supplied via a data network. The source of the input signal 204 may be external to the system such as from the fuel analyzer 198 or other external systems or components 199. When input signal 204 is available at interface system 119, at the time of commissioning or a subsequent service event commissioning or service personnel may utilize the HMI 112 to configure the fuel characterization selection input, the number of input fuel compositions, the fuel constituent values for each composition, and the mapping of input fuel compositions to fuel characterization selection input values. The fuel composition may in response be determined based on the fuel characterization selection input value and the input information entered by commissioning or service personnel. For example, the fuel composition is set to the fuel composition mapped to the fuel characterization selection input value and this fuel composition may be utilized as the input to subsequent calculations. The input signal 204 may be provided in a number of forms including, discrete forms and analog forms. In one example implementation, the input signal 204 may comprise a 4-20 mA input and operation 210 may interpret different input ranges as identifying different fuel characterizations, for example, a first range may be interpreted as indicating a first fuel type, a second range may be interpreted as indicating a second fuel type, a third range may be interpreted as indicating a third fuel type, etc.

In a fourth approach, operation 220 may utilize a fuel methane percentage input signal 206 representing the percentage of methane in the fuel being supplied to the engine 132. For example, when input signal 206 is available at interface system 119, at the time of commissioning or a subsequent service event, commissioning or service personnel may utilize the HMI 112 to configure the fuel methane percent input, the number of input fuel compositions, the fuel constituent values for each composition, and the mapping of input fuel compositions to fuel methane percent input values. The fuel composition may then be determined based on the fuel methane percent input value and the fuel configuration input information entered by commissioning or service personnel. The fuel composition may be determined by linearly interpolating the individual fuel composition constituents from the input fuel compositions as a function of the fuel methane percentage input and the configured mapping of input fuel compositions to fuel methane percent input values. The individual constituents of the fuel composition may be set to the interpolated values and this fuel composition may be utilized as the input to subsequent calculations. It shall be appreciated that other techniques may be utilized instead of or in addition to linear interpolation, such as curve-fitting, polynomial fitting, and other methods as will occur to one of skill in the art with the benefit of the present disclosure.

In a fifth approach, operation 220 may utilize the fuel characterization input signal 204 and the fuel methane percentage input signal 206 in determining fuel composition constituents. When input signals 204 and 206 are both available at interface system 119, at the time of commissioning or a subsequent service event, commissioning or service personnel may utilize the HMI 112 to configure the fuel characterization selection input, the fuel methane percent input, the number of input fuel compositions, the fuel constituent values for each composition, the mapping of a subset of input fuel compositions to fuel methane percent input values, and the mapping of input and intermediate fuel compositions to fuel characterization selection input values. The fuel composition may be determined based on the fuel methane percent input value, the fuel characterization selection input value and the fuel configuration input information entered by commissioning or service personnel. For example, an intermediate fuel composition is determined by linearly interpolating the individual fuel composition constituents from the input fuel compositions as a function of the fuel methane percentage input and the configured mapping of input fuel compositions to fuel methane percent input values. The individual constituents of the intermediate fuel composition may be set to the interpolated values. The fuel composition may then set the fuel composition mapped to the fuel characterization selection input value (e.g., as intermediate fuel composition such as described herein) and this fuel composition is utilized as the input to subsequent calculations.

Operation 220 may determine fuel composition constituents and provide the same output in a number of forms, such as fuel composition constituents 222. In certain forms, fuel composition constituents may comprise metrics, such as amounts, percentages, PPM, or other metrics, of any of the plurality of fuel compositions, for example, $CH_4$ (Methane), $C_2H_6$ (Ethane), $C_3H_8$ (Propane), $C_4H_{10}$ (isoButane), $C_4H_{10}$ (n-Butane), $C_5H_{12}$ (isoPentane), $C_5H_{12}$ (n-Pentane), $C_6H_{14}$ (n-Hexane), $C_7H_{16}$ (n-Heptane), $C_8H_{18}$ (n-Octane), $C_9H_{20}$ (n-Nonane), $C_{10}H_{22}$ (n-Decane), $H_2$ (Hydrogen), $H_2S$ (Hydrogen Sulfide), $CO$ (Carbon Monoxide), $CO_2$ (Carbon Dioxide), $N_2$ (Nitrogen), and $O_2$ (Oxygen). In other embodiments, the composition may be characterized by more or fewer constituents or combinations or groups of some of the constituents such as ranges of the number of carbon atoms, molecular weights, or other combinations or groupings.

It shall be appreciated that operation 220 is one example of an operation which determines or generates a set of fuel composition constituents, in response to one or more of fuel configuration information, an input signal representing the percentage of methane in the fuel, and a fuel characterization selection input signal. The fuel composition constituents may, in turn, be utilized by process 200 in performing further determinations.

From operation 220, process 200 proceeds to operation 230 which determines one or more fuel properties in response to the one or more fuel composition constituents. Each of the fuel properties indicates a physical property of the fuel as characterized by the one or more fuel composition constituents. As illustrated in FIG. 4, for example, the one or more fuel composition constituents may be utilized to calculate a plurality of fuel properties 233. Fuel properties 233 comprise a number of properties 302, 312, 322, 332, 333, and 342. Properties 302 comprise a lower heating value and a methane number corresponding to the one or more fuel composition constituents. Properties 312 comprise numbers of atoms in a quantity of fuel of the one or more elements that may comprise the fuel, for example, a number of Carbon atoms, a number of Hydrogen atoms, a number of Oxygen atoms, and a number of Nitrogen atoms. Properties 322, 332, and 333, comprise a molecular weight, a gas constant, and a ratio of specific heats of the one or more fuel composition constituents, respectively. Properties 342 comprise a thermal conductivity and a viscosity of the one or more fuel composition constituents.

Fuel properties 233 may be determined by a number of operations including calculations, querying lookup tables, or by other computing operations or techniques based on the physical relationships of properties 302, 312, 322, 332, 333, and 342 and the fuel composition constituents received by operation 230. It shall be appreciated that fuel properties 233 for each of the plurality of fuel composition constituents may be known or determinable. Furthermore, when the amount or proportion of the plurality of fuel composition constituents is known, a calculation may be performed to determine the fuel properties 233 as net or aggregate values indicative of properties of a fuel mixture or combination of fuels being provided to the engine 132.

The fuel properties 233 may be utilized by one or more operations 235 to determine a number of control parameters. The control parameters determined by operations 235 may be utilized in controlling combustion, fueling, and other operations of the engine 132 directly. The control parameters determined by operations 235 may be utilized to directly control the engine 132, to indirectly control the engine 132 by adjusting or modifying one or more other control logic parameters, or to indirectly control the engine 132 by adjusting or modifying one or more sensed values.

As shown in FIG. 4, one or more of the fuel properties 233 may be provided to one or more of the operations 235. For example, properties 302 may be provided to operation 402 which determines a spark timing command adjustment, operation 404 which determines an engine performance criterion command adjustment, and operation 406 which determines a lambda command adjustment (or another air-fuel-ratio (AFR)-related command adjustment). In some embodiments, the adjustments may be determined by interpolations performed on lookup tables. In some embodiment, the adjustments may be determined by calculations. It shall be appreciated that the spark timing command may control the ignition timing for a given combustion cylinder or may serve as a reference of base value from which the ignition timing for one or more individual combustion cylinders may be determined. The engine performance criterion command may be utilized in certain operating modes of the engine as a target corresponding to operation of the engine with a limited engine exhaust gas emissions level to control operation of combustion control subsystems of the engine 132 to achieve a target or desired engine performance criterion value. The lambda command may be utilized as a target or commanded lambda value (or other AFR value) used to control an operation of fueling subsystems and/or air handling subsystems of the engine 132 to achieve a target or desired lambda value (or other AFR value). Properties 302 may also be utilized to trigger a warning, prevent an engine start or initiate an engine shutdown when the determined property is too high or too low for proper engine operation. In some embodiments, properties 302 may additionally or alternatively be provided to a NOx command adjustment operator which is configured and operable to set or adjust a target for engine-out NOx, e.g., a target for NOx present in exhaust output by the engine prior to any reduction of NOx by an aftertreatment component (if present). It shall be appreciated that the NOx command adjustment operator may be provided to operator 240, for example, as illustrated with respect to operators 402, 404, and 406. It shall be further appreciated that other references herein to NOx output may likewise refer to engine-out NOx.

Properties 312 may be provided to operation 412 which determines one or more adjustments to a sensed lambda value (or to another sensed AFR-related value), and operation 414 which determines one or more adjustments to a stoichiometric AFR parameter which may be used in the determination of a gas mass flow command. The sensed lambda value (or another AFR-related value) may be determined from the sensed exhaust gas oxygen value on the basis of the relationship of combustion product oxygen to the amount of excess reactant air established by the chemical equation describing combustion of a general gaseous fuel in the presence of air in excess of the stoichiometric requirement. The relationship of exhaust gas oxygen to lambda depends on fuel properties 312 and may therefore be adjusted on the basis of these properties. The stoichiometric air/fuel ratio may be determined on the basis of the chemical equation describing stoichiometric combustion of a general gaseous fuel with air. This determination depends on fuel properties 312 and the stoichiometric air/fuel ratio may therefore be adjusted on the basis of these properties.

Property 322 may be provided to operation 422 which determines one or more adjustments to a charge mixture molecular weight control parameter which influences the air mass flow value which may be used in the determination of the gas mass flow command. The charge mixture molecular weight may be determined from the molecular weight of air and property 322 using a relationship based on a mixture calculation under the assumption that both the air and the fuel are perfect gases. The charge mixture molecular weight may therefore be adjusted on the basis of property 322. The gas mass flow command may be utilized in controlling fueling subsystems of the engine 132.

Properties 332 and 333 may be provided to operation 432 which determines adjustments to fuel control valve command(s) which control the admission of gaseous fuel to the engine. A fuel control valve command may be developed from a gas mass flow command on the basis of relationships that model compressible flow through a restriction. These relationships depend on fuel properties 332 and 333. A fuel control valve command adjustment may therefore be determined on the basis of these properties.

Properties 342 may be provided to operation 442 which determines one or more adjustments to a sensed gas mass flow value determined from the gas mass flow sensor input signal. A sensed gas mass flow value may be determined from the gas mass flow sensor input signal on the basis of the relationship established by the equation that relates mass flow to the sensor output signal. The sensor used to measure gas (fuel) flow may be a hot-wire/hot-film type sensor. The sensor uses heat dissipation from a hot wire/hot-film arrangement to measure the flow. The electrical current through the hot wire is indicative of the gas flow at the sensor. The sensor provides an output voltage signal in response to the current through the hot wire. The relationship of the current through the hot wire to gas mass flow depends on fuel properties 342. On the basis of this relationship, an adjustment may be made to the gas mass flow sensor signal using properties 342 to determine an adjusted sensed gas mass flow value. The sensed gas mass flow value may be subsequently used in the determination of gas mass flow through the fuel system which may be utilized in controlling an operation of fueling subsystems and/or air handling subsystems of the engine 132.

From operation 230, process 200 may proceed to operation 240, which determines one or more engine controller adjustments in response to the determinations made by operations 235. Thus, for example, operation 240 may process the information received from operations 235 to determine adjustments, settings, or other control parameters which may be utilized by combustion and fueling control 232 of the ECS 134 to control operation of the engine 132. The ECS 134 may utilize the adjustments, settings, or other control parameters by executing, referencing, or further processing at operation 250 to control operation of the engine 132. In some embodiments, operation 240 may utilize the information received from operations 235 to determine baseline adjustments, and may further utilize the information received from operation 1004 which may be input or adjusted by commissioning or service personnel utilizing HMI 112, a determined fuel composition methane constituent percentage 1003 received from operation 220 and a sensed intake manifold absolute pressure 1005 to determine adjustments which may be utilized to fine-tune such baseline adjustments.

From operation 230, process 200 may additionally or alternatively proceed to operation 245, which performs a diagnostic and/or determines a response. From operation 245, process 200 proceeds to operation 255 where the ECS 134 applies the response in controlling operation of the engine 132.

It shall be appreciated that process 200 includes and may apply to a number of applications and embodiments. For example, process 200 is one example of a process according to the present disclosure that may be implemented in unique computer systems and computer implemented processes providing a commissioning and service interface accommodating entry of fuel composition and other information into the controller. Additionally, process 200 is one example of a process that may be implemented in unique computer systems and computer implemented processes including the generation of a set of fuel composition constituents from an input signal representing the percentage of methane in the fuel and/or a fuel characterization selection input signal on the basis of entered fuel composition information for such inputs. Furthermore, process 200 is one example of a process that may be implemented in unique computer systems and computer implemented processes utilizing fuel composition constituents to determine a set of fuel properties. Also, process 200 is one example of a process that may be implemented in unique computer systems and computer implemented processes utilizing the fuel composition-based fuel properties to adjust the lambda, ignition system spark timing, engine performance criterion, gas mass flow and fuel control valve commands and the lambda and gas mass flow sensed values. Further, process 200 is one example of a process that may be implemented in unique computer systems and computer implemented processes utilizing one or more fuel composition constituents to annunciate a warning, prevent an engine start, initiate an engine shutdown, or derate engine speed and/or engine torque when the constituent value is too high or too low for proper engine operation. Additionally, process 200 is one example of a process that may be implemented in unique computer systems and computer implemented processes utilizing one or more determined fuel properties to annunciate a warning, prevent an engine start, initiate an engine shutdown, or derate engine speed and/or engine torque when the determined property is too high or too low for proper engine operation. Furthermore, process 200 is one example of a process that may be implemented in unique computer systems and computer implemented processes for performing commissioning and in-service adjustment of the combustion and fuel control system of a spark ignited gaseous fueled engine at commissioning, at service events, or in real-time in response to fuel composition changes. Additionally, process 200 is one example of a process that provides real-time automatic adjustment of the combustion and fuel control system of a spark ignited gaseous fueled engine in the presence of fuel composition that changes on the basis of an input signal representing the percentage of methane in the fuel and/or a fuel characterization selection input signal. In some embodiments, a variety of other fuel constituents or properties in addition to or instead of the fuel constituents or properties disclosed herein, could be considered and utilized by process 200 including, for example, specific gravity of fuel or a fuel mixture, higher heating value (HHV) of fuel or a fuel mixture, and other fuel constituents or properties of fuel or a fuel mixture as will occur to one of skill in the art with the benefit and insight of the present disclosure. Such other fuel constituents or properties may be utilized by process 200 in the same or a similar manner as that described in connection with process 200.

Figure 5:
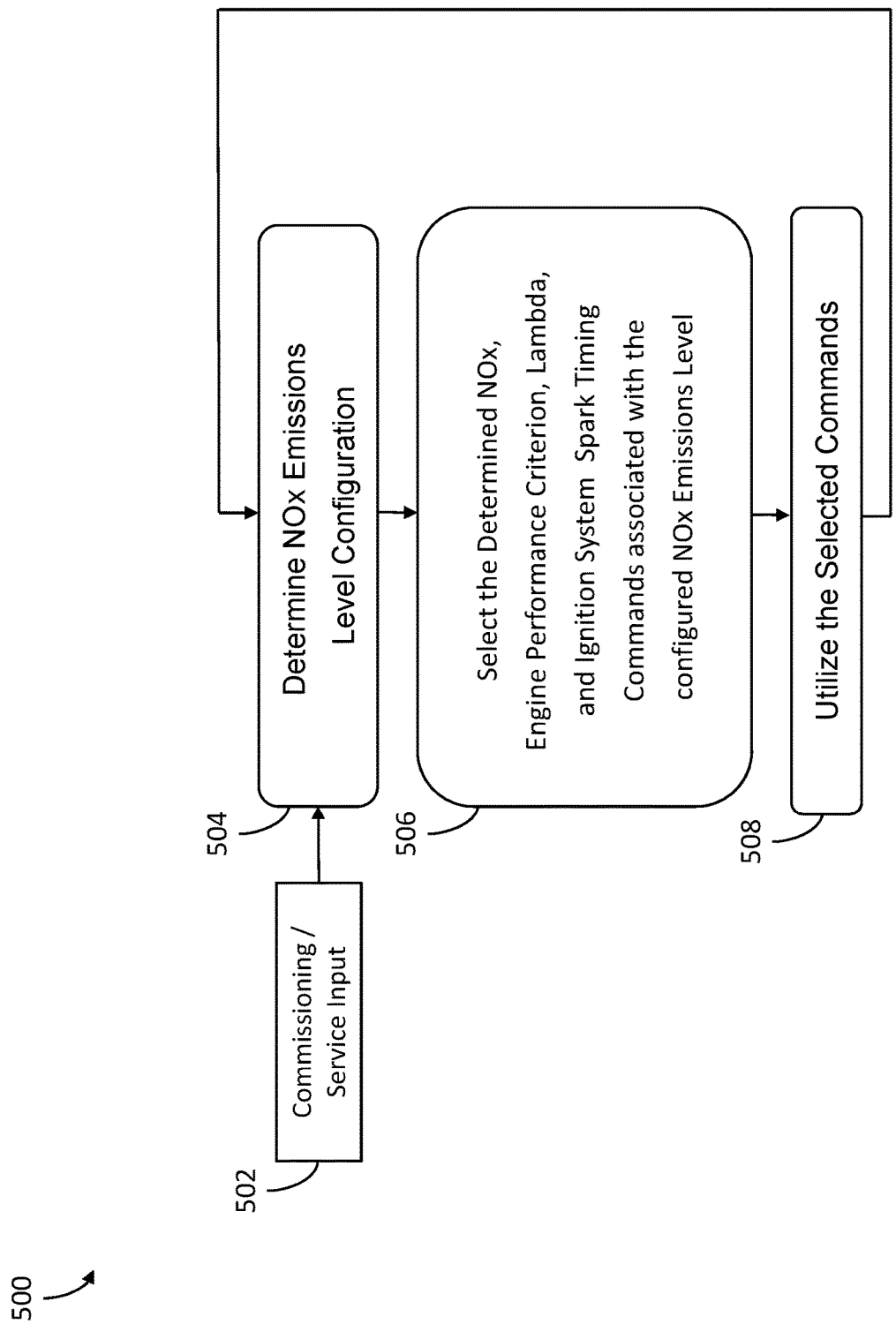
FIGS. 5-12 are flowcharts illustrating certain aspects of example processes according to the present disclosure.

With reference to FIG. 5, there is illustrated an example process 500 that may be implemented in unique computer systems and computer implemented processes providing a commissioning and service interface to select the engine exhaust gas NOx emissions level. Process 500 includes operation 504 which receives commissioning/service input 502 from commissioning or service personnel via an HMI and determines a NOx emissions level configuration in response thereto. From operation 504, process 500 proceeds to operation 506 which selects the determined NOx, engine performance criterion, lambda, and ignition system spark timing commands associated with the NOx emissions level configuration. From operation 506, process 500 proceeds to operation 508 which utilizes the selected commands.

Process 500 may be implemented to provide an interface allowing commissioning or service personnel to configure the engine exhaust gas NOx emissions level in applications in which the emissions level and units are configurable. For example, there may be three unique emissions levels possible for each set of units and two sets of units. For each combination of level and units, process 500 can generate a unique set of combustion control commands. The combustion control commands may include one or more of: NOx, engine performance criterion, lambda, and ignition system spark timing commands. A number of command generation approaches may be utilized. In some command generation approaches, a unique set of data required for the calculation of the set of combustion control commands is associated with the combination of configured emissions level and unit. The data for a given emissions level and unit combination is selected based on the entered information and used to determine the associated set of combustion control commands. In some command generation approaches, a unique adjustment to one or more of a set of combustion control commands is associated with each combination of configured emissions level and units. The adjustment(s) for a given emissions level and unit combination is/are selected based on the entered information and applied to the set of combustion control commands. Other methods for determining the commands on the basis of the configuration may also be utilized as will occur to one of skill in the art with the benefit of the present disclosure.

It shall be appreciated that the parameters and values determined, adjusted, modified, or set by process 500 or upon which process 500 operates, may be initially preloaded, pre-set, or otherwise provided with a default or base configuration that may be subsequently altered or modified, for example, in response to input from commissioning or service personnel. Such parameters and values may be determined by process 500 by accessing, calling, reading, referencing, or otherwise using default or initial values. Furthermore, where such parameters and values are adjusted, modified, or set process 500 may determine such values by participating in the adjustment, modification, or setting of such parameters and values as well as by accessing, calling, reading, referencing, or otherwise using the same. It shall be further appreciated that the same is true of and applies, mutatis mutandis, to the parameters and values determined, adjusted, or set by processes 500, 600, 700, 800, 900, 1000, 1100, and 1200 described below.

Figure 6:
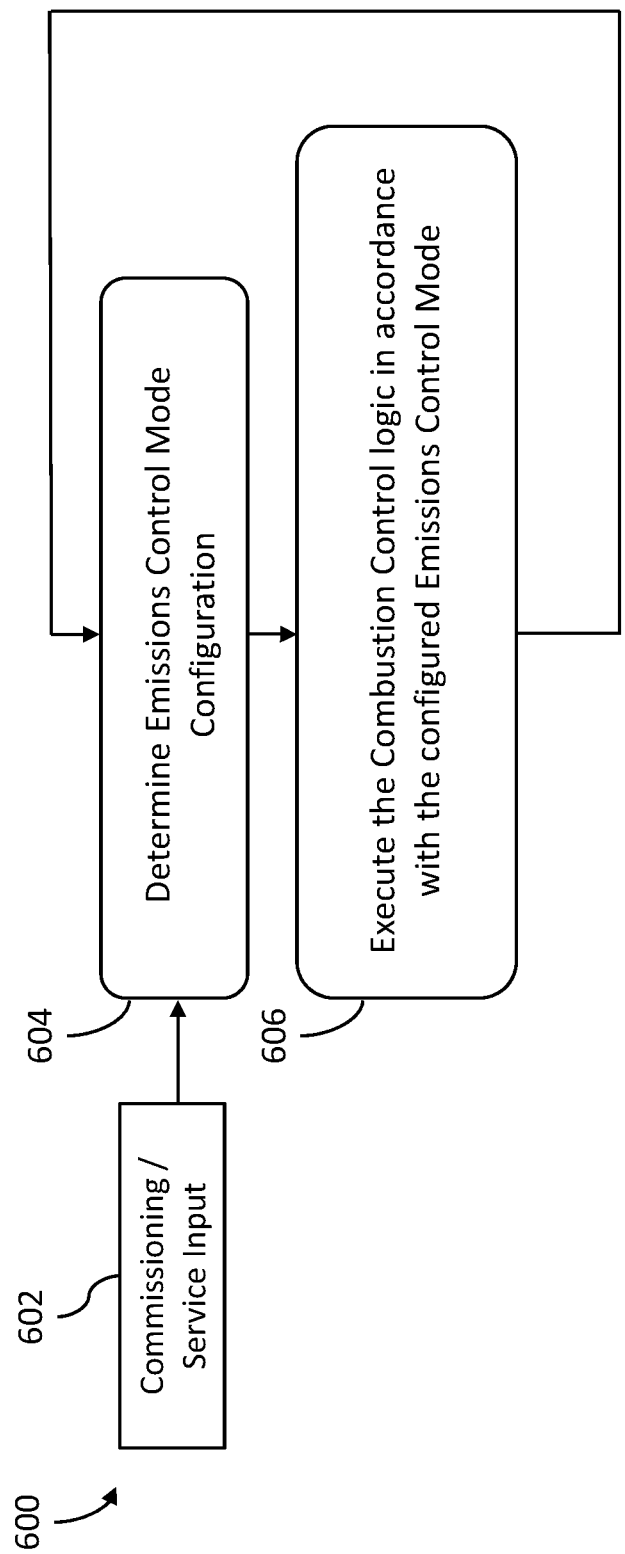

With reference to FIG. 6, there is illustrated an example process 600 that may be implemented in unique computer systems and computer implemented processes providing a commissioning and service interface to select the emissions control mode. Process 600 includes operation 604 which receives commissioning/service input 602 from commissioning or service personnel via an HMI and determines an emissions control mode configuration in response thereto. From operation 604, process 600 proceeds to operation 606 which executes the combustion control logic in accordance with the configured emissions control mode.

Process 600 may be implemented to provide an interface allowing commissioning and service personnel to configure the emissions control mode of the system. One of two modes may be configured. When the first operating mode is selected, the combustion control logic is configured to make use of measurements from the NOx and exhaust gas oxygen sensors. When the second operating mode is selected, the combustion control logic is configured to utilize an alternate strategy that does not use measurements from NOx or exhaust gas oxygen sensors. The second mode involves using the engine performance criterion command and sensed value in place of the NOx command and sensed value, as well as open-loop lambda control.

Figure 7:
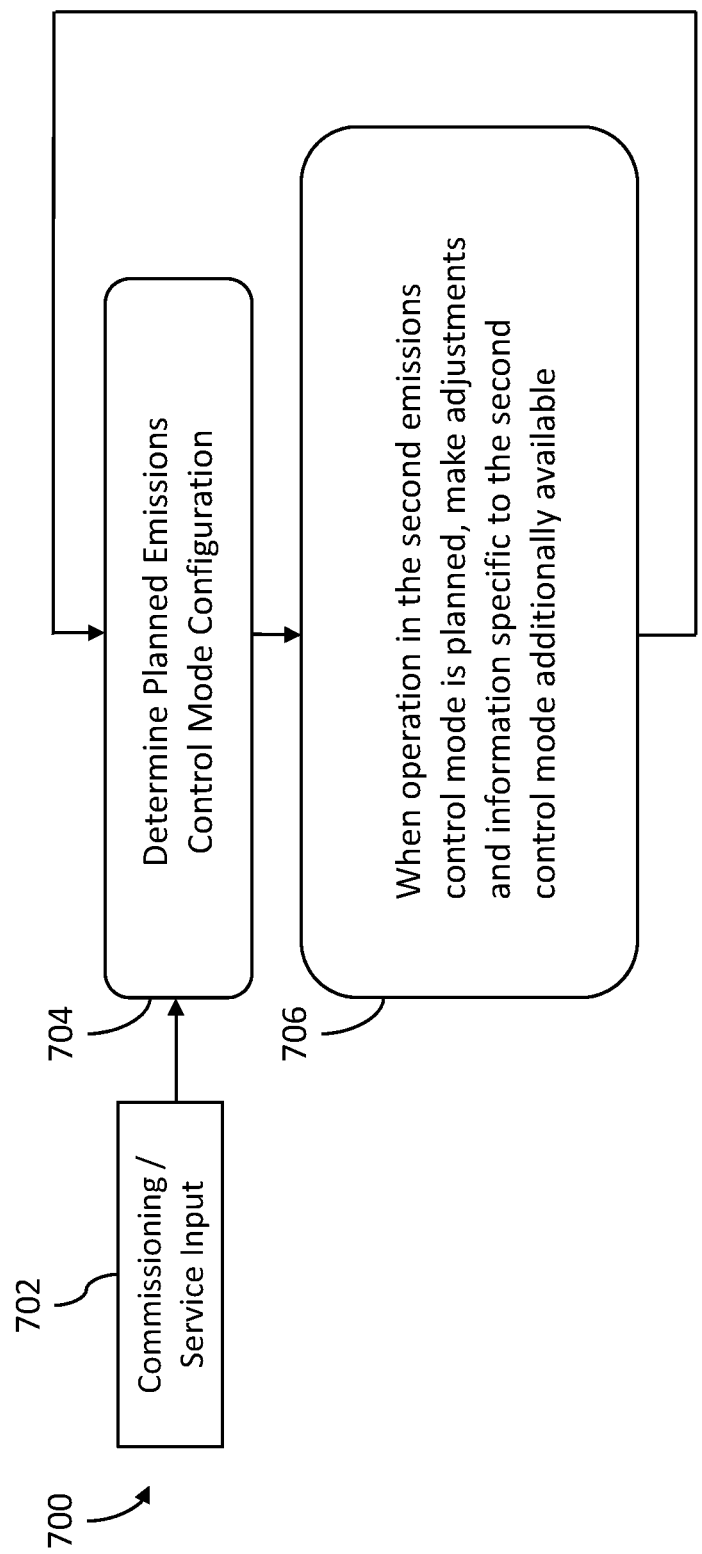

With reference to FIG. 7, there is illustrated an example process 700 that may be implemented in unique computer systems and computer implemented processes providing a commissioning and service interface to permit setting of the adjustments that will be used in a second emissions control mode while operating in the first mode. Process 700 includes operation 704 which receives commissioning/service input 702 from commissioning or service personnel via an HMI and determines a planned emissions control mode configuration in response thereto. From operation 704, process 700 proceeds to operation 706 which, when future operation in the second emissions control mode is planned, makes adjustments and information specific to the second control mode additionally available. Thus, when operating in the first mode, an additional interface is included to allow commissioning and service personnel to indicate to the control system that future operation in the second mode is planned when the unit is put into service. When this indication is active, an additional set of lambda adjustments specific to the second operating mode is made available to commissioning and service personnel.

Figure 8:
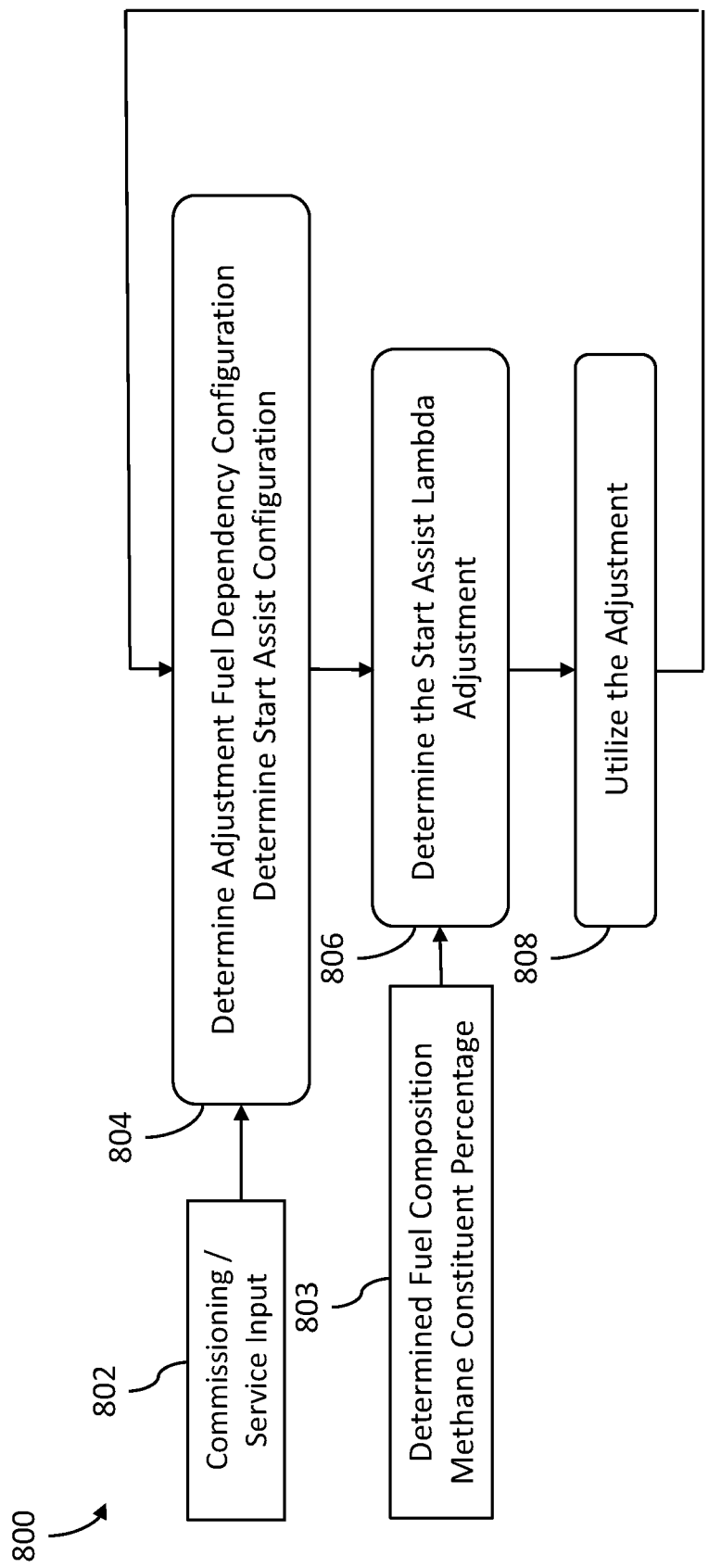

With reference to FIG. 8, there is illustrated an example process 800 that may be implemented in unique computer systems and computer implemented processes providing an interface allowing commissioning and service personnel to adjust the air/fuel ratio of the charge mixture admitted to the engine during a start attempt. This adjustment may be a lambda adjustment which is applied to the lambda command utilized when the engine is cranked. Process 800 includes operation 804 which receives commissioning/service input 802 from commissioning or service personnel via an HMI, and determines an adjustment fuel dependency configuration and a start assist configuration in response thereto. From operation 804, process 800 may proceed to operation 806 which receives an adjustment fuel dependency configuration, a start assist configuration, and a determined fuel composition methane constituent percentage input 803 and determines a start assist lambda adjustment in response thereto. From operation 806, process 800 proceeds to operation 808 which utilizes the start assist lambda adjustment to perform a start assist operation.

Figure 9:
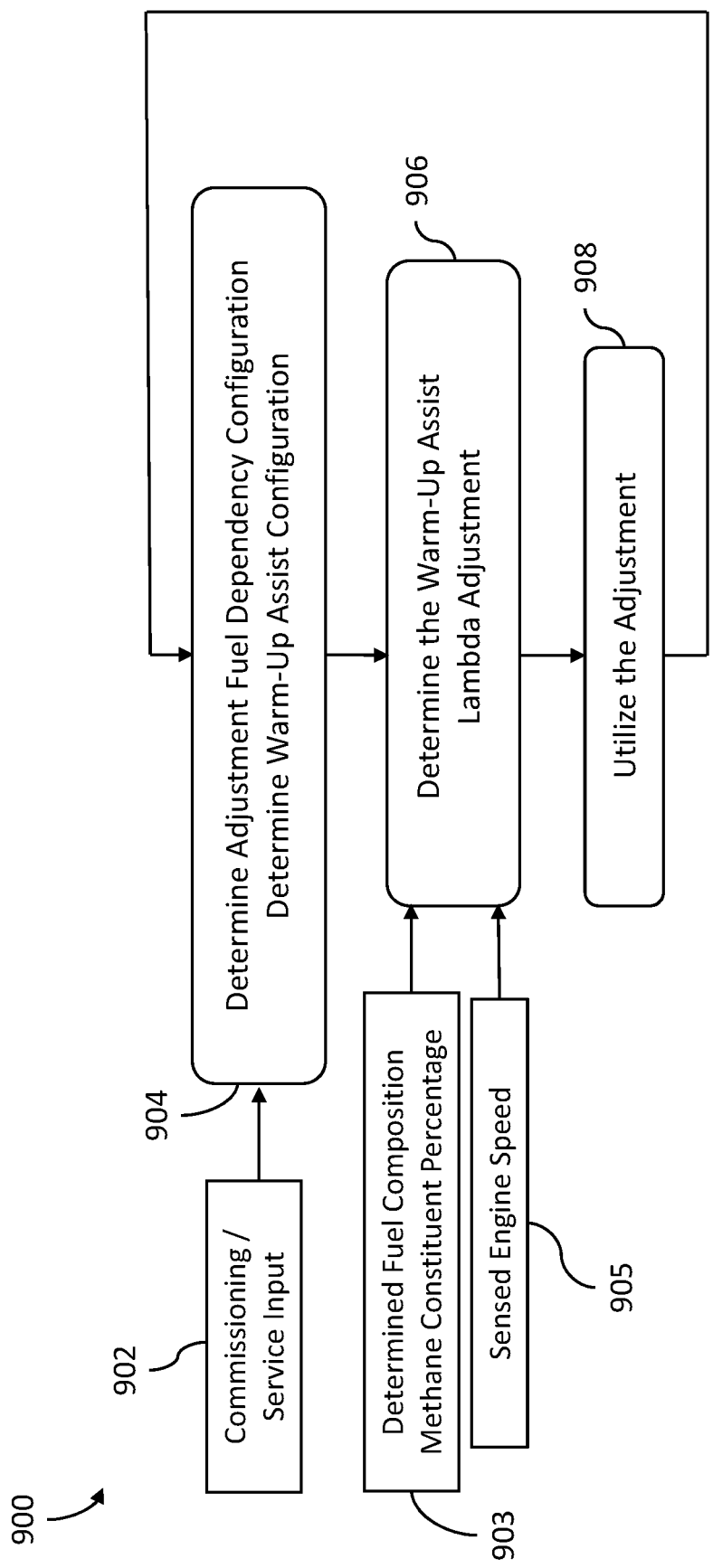

With reference to FIG. 9, there is illustrated an example process 900 that may be implemented in unique computer systems and computer implemented processes providing an interface allowing commissioning and service personnel to adjust the air/fuel ratio of the charge mixture admitted to the engine immediately following a start attempt while the engine is warming up. Process 900 includes operation 904 which receives commissioning/service input 902 from commissioning or service personnel via an HMI, and determines an adjustment fuel dependency configuration and a warm-up assist configuration in response thereto. From operation 904, process 900 may proceed to operation 906 which receives an adjustment fuel dependency configuration, a warm-up assist configuration, a determined fuel composition methane constituent percentage input 903 and a sensed engine speed 905 and determines a warm-up assist lambda adjustment in response thereto. From operation 906, process 900 proceeds to operation 908 which utilizes the warm-up assist lambda adjustment to perform a warm-up assist operation.

It shall be appreciated that the lambda adjustment provided by process 900 and operation 906 in particular can be configured as a function of engine speed. There are two configurable engine speed breakpoints, each having an associated lambda adjustment breakpoint. Using the configured parameters, the adjustment is determined as a function of engine speed. For example, the warm-up assist lambda adjustment is determined by linearly interpolating the adjustment as a function of the measured engine speed using the configured mapping of lambda adjustment breakpoint values to engine speed breakpoint values. The warm-up assist lambda adjustment is set to the interpolated value and applied to the lambda command in combustion control operating modes associated with engine warm-up.

Figure 10:
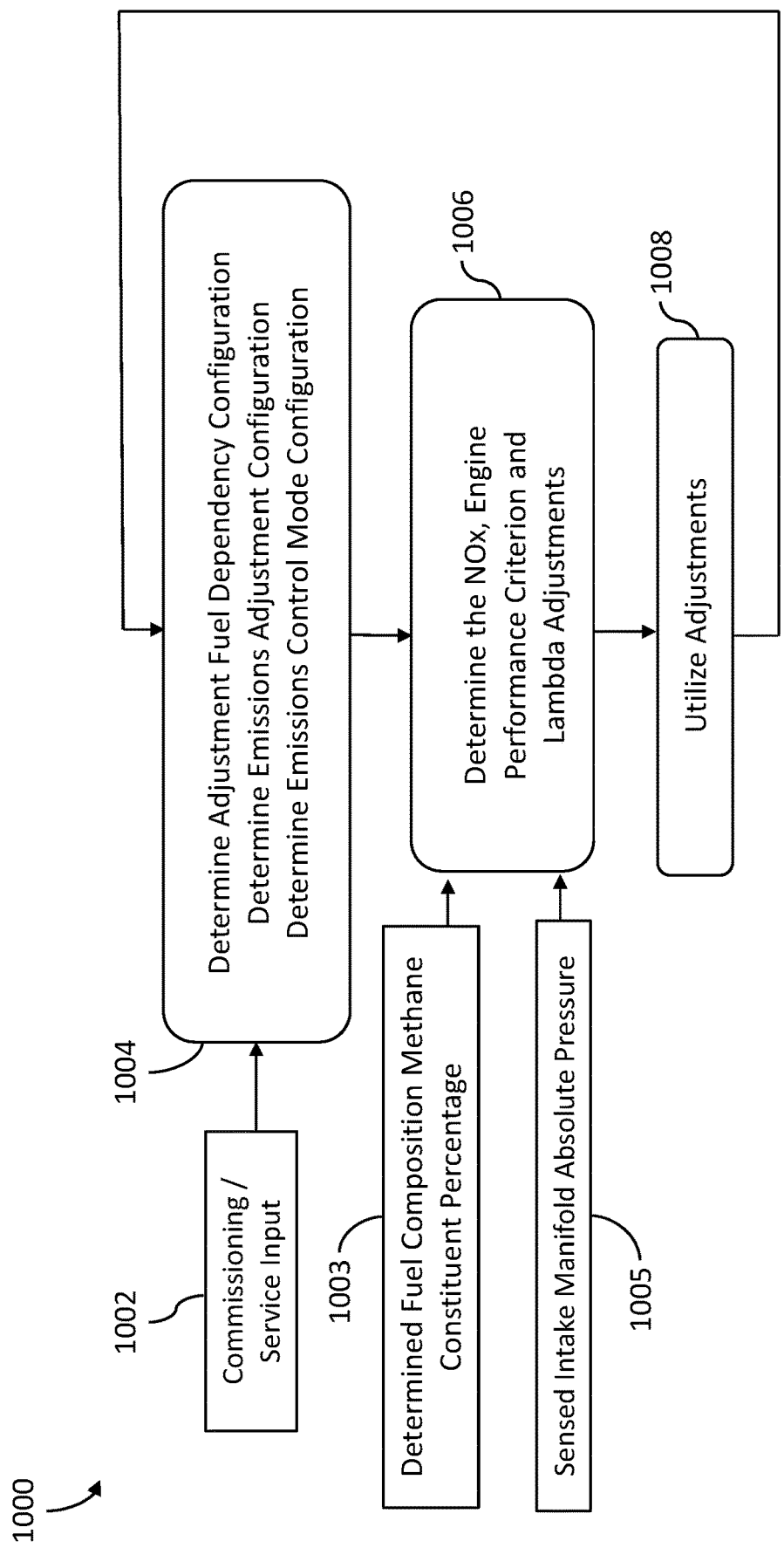

With reference to FIG. 10, there is illustrated an example process 1000 that may be implemented in unique computer systems and computer implemented processes providing an interface allowing commissioning and service personnel to adjust the NOx, engine performance criterion, and lambda command(s). Process 1000 includes operation 1004 which receives commissioning/service input 1002 from commissioning or service personnel via an HMI, and determines adjustment fuel dependency configuration, an emissions adjustment configuration, and an emissions control mode configuration in response thereto. From operation 1004, process 1000 may proceed to operation 1006 which receives an adjustment fuel dependency configuration, an emissions adjustment configuration, an emissions control mode configuration, a determined fuel composition methane constituent percentage 1003 and a sensed intake manifold absolute pressure 1005 and determines the NOx, engine performance criterion, and lambda adjustments in response thereto. From operation 1006, process 1000 proceeds to operation 1008 which utilizes the adjustments in controlling operation of the engine.

Process 1000 may be implemented to provide an interface allowing commissioning and service personnel to adjust the NOx, engine performance criterion, and lambda commands. The adjustments to these commands can be configured as a function of intake manifold absolute pressure. There are eight configurable manifold pressure breakpoints, each having an associated set of NOx, engine performance criterion, and lambda adjustment breakpoints. Using the configured parameters, the NOx, engine performance criterion, and lambda adjustments are determined as a function of manifold pressure. For example, the NOx, engine performance criterion, and lambda adjustments are determined by linearly interpolating each adjustment as a function of the measured manifold pressure using the configured mapping of adjustment breakpoint values specific to a given adjustment to manifold pressure breakpoint values. The NOx, engine performance criterion, and lambda adjustments are set to the corresponding interpolated values and applied to the NOx, engine performance criterion, and lambda commands respectively. Unique lambda adjustments are possible for each emissions control mode. Calculation of the lambda adjustment is dependent on the selected emissions control mode.

Processes 800, 900, and 1000 may be implemented to provide an interface allowing commissioning and service personnel to enable and configure additional adjustments for start assist, warm-up assist, and combustion control. When enabled, these adjustments are additionally determined as a function of the determined fuel composition methane constituent. The number of fuel methane constituent percent breakpoints can be either two or three based on a configured selection. When enabled, the start assist adjustment is determined as a function of the determined fuel composition methane constituent. For example, the start-assist lambda adjustment is determined by linearly interpolating the adjustment as a function of the determined fuel composition methane constituent using the configured mapping of start assist lambda adjustment breakpoint values to fuel methane constituent percent breakpoint values. The start-assist lambda adjustment is set to the interpolated value and applied to the lambda command utilized when the engine is cranked. The warm-up assist adjustment is determined as a function of engine speed and the determined fuel composition methane constituent. For example, the warm-up assist lambda adjustment is determined by linearly interpolating the adjustment as a function of the measured engine speed and the determined fuel composition methane constituent using the configured mapping of warm-up assist lambda adjustment breakpoint values to engine speed and fuel methane constituent percent breakpoint values. The warm-up assist lambda adjustment is set to the interpolated value and applied to the lambda command in combustion control operating modes associated with engine warm-up. The NOx, engine performance criterion, and lambda adjustments are determined as a function of manifold pressure and the determined fuel composition methane constituent. For example, the NOx, engine performance criterion, and lambda adjustments are determined by linearly interpolating each adjustment as a function of the measured manifold pressure and the determined fuel composition methane constituent using the configured mapping of adjustment breakpoint values specific to a given adjustment to manifold pressure and fuel methane constituent percent breakpoint values. The NOx, engine performance criterion, and lambda adjustments are set to the corresponding interpolated values and applied to the NOx, engine performance criterion, and lambda commands respectively.

Figure 11:
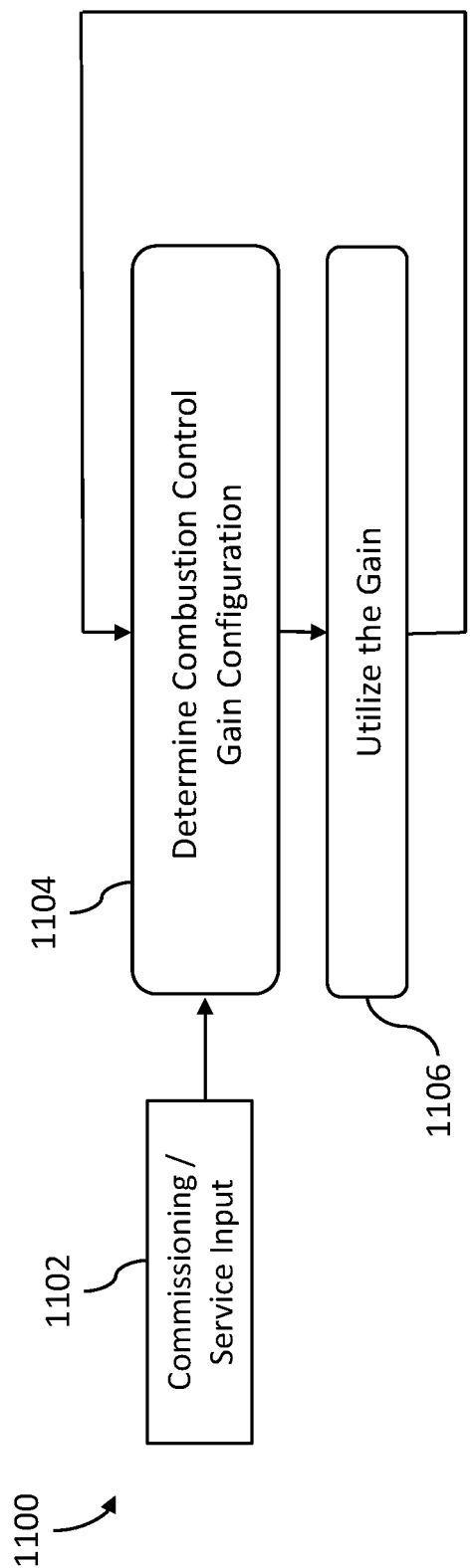

With reference to FIG. 11, there is illustrated an example process 1100 that may be implemented in unique computer systems and computer implemented processes providing an interface allowing commissioning and service personnel to change a combustion control gain value. Process 1100 includes operation 1104 which receives commissioning/service input 1102 from commissioning or service personnel via an HMI and determines a combustion control gain configuration in response thereto. From operation 1104, process 1100 proceeds to operation 1106 which utilizes the gain, for example, the gain may be set or ramped down to a zero or off state in response to input 1102 in order to disable closed-loop combustion control or set or ramped up to a one or on state to fully enable closed-loop combustion control.

Figure 12:
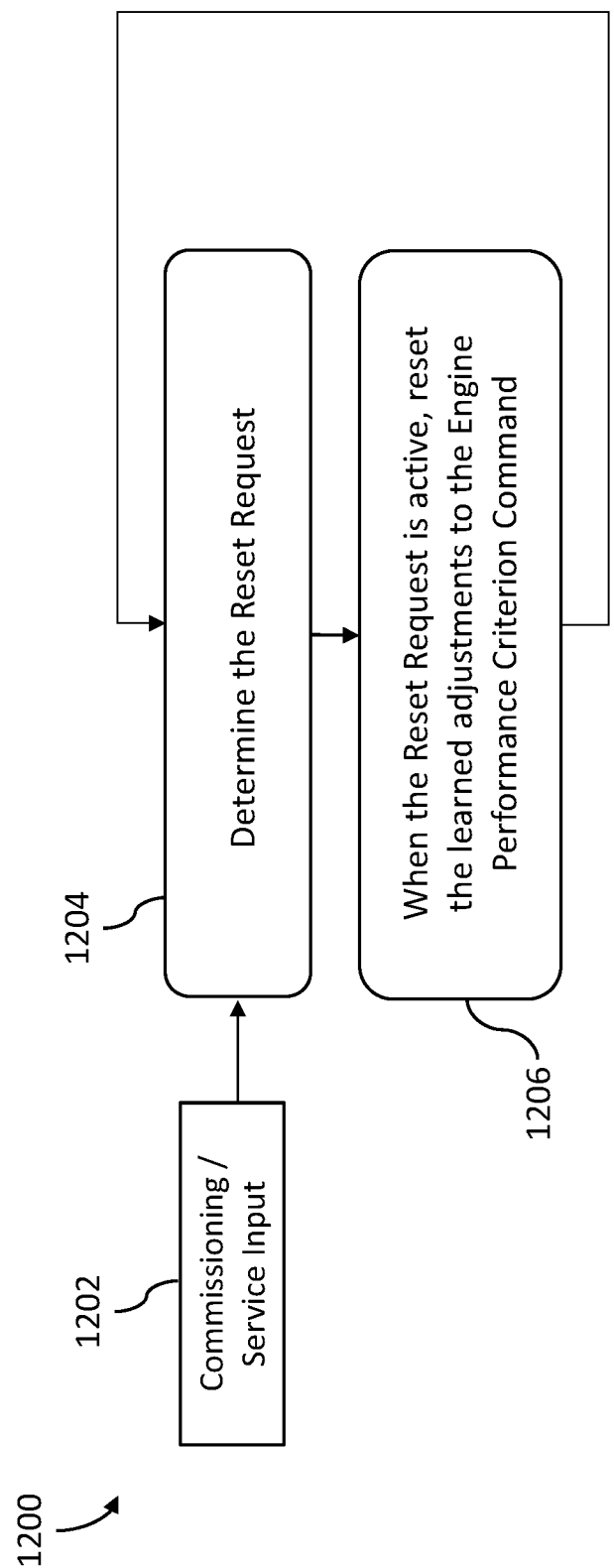

With reference to FIG. 12, there is illustrated an example process 1200 that may be implemented in unique computer systems and computer implemented processes providing an interface to reset learned combustion control system parameters. Process 1200 includes operation 1204 which receives commissioning/service input 1202 from commissioning or service personnel via an HMI, and determines a reset request in response thereto. From operation 1204, process 1200 proceeds to operation 1206 which, when the reset request is active and any other reset preconditions are satisfied, resets the learned adjustments to the engine performance criterion command. The reset operations of process 1200 may be ramped such that a reset is performed gradually, for example, while the engine is operating, or may be reset by a step-change, for example, if the engine is off. Process 1200 may be implemented to provide an interface allowing commissioning and service personnel to reset learned combustion control system parameters. When initiated via this interface, the learned adjustments to the engine performance criterion command are reset. The reset feature of process 1200 may utilize a global electronic feature configuration method to implement the reset. The method is applicable to controllers that interface with each other via a datalink. It uses a single pair of datalink messages applicable to multiple electronic features that can be used to perform the configuration of an electronic feature using a common set of operations such as "enable feature," "disable feature," and "reset feature." The first controller may send out an electronic feature configuration request message to the second controller. The request message may include identifying information for the feature to be configured and the specific operation requested. The second controller, then, responds with an electronic feature configuration status message, which may include identifying information for the configured feature and the result of the request.

As shown by this detailed description, the present disclosure contemplates multiple and various embodiments, including, without limitation, the following example embodiments. A first example embodiment is a computer system comprising: a processor configured to receive input from a human-machine interface (HMI); and a non-transitory memory medium in operative communication with the processor and configured with instructions executable by the processor to perform the acts of: determining fuel composition constituents, the fuel composition constituents indicating an amount of at least one of a plurality of molecules, determining one or more fuel properties in response to one or more fuel composition constituents, the one or more fuel properties indicating at least one physical property of the at least one of the plurality of molecules, determining one or more engine controller adjustments in response to at least one of the fuel composition constituents and the one or more fuel properties, the one or more engine controller adjustments adjusting at least one of a control command and a sensed value utilized in controlling an engine, and providing the one or more engine controller adjustments to an engine control system.

A second example embodiment includes the features of the first example embodiment and comprises determining a fuel configuration indicating at least one of an input, a setting, and a rule to be used in determining fuel composition constituents.

A third example embodiment includes the features of the second example embodiment, wherein the act of determining fuel composition constituents is performed in response to the fuel configuration.

A fourth example embodiment includes the features of the second example embodiment, wherein the act of determining a fuel configuration is performed in response to input received via the HMI.

A fifth example embodiment includes the features of the third example embodiment, wherein the act of determining fuel composition constituents in response to at least the fuel configuration is further in response to one or both of a fuel methane percentage input and a fuel characterization selection input.

A sixth example embodiment includes the features of the first example embodiment, wherein the act of determining fuel composition constituents comprises determining an absolute or relative amount or proportion of one or more molecules.

A seventh example embodiment includes the features of the first example embodiment, wherein the act of determining one or more fuel properties comprises determining a lower heating value and a methane number in response to the fuel composition constituents.

An eighth example embodiment includes the features of the seventh example embodiment and comprises determining one or more of a spark timing command adjustment, an engine performance criterion command adjustment, and a lambda command or another air-fuel ratio command adjustment in response to one or both of the lower heating value and the methane number.

A ninth example embodiment includes the features of the first example embodiment, wherein the act of determining one or more fuel properties comprises determining a number of a plurality of atoms in response to the fuel composition constituents.

A tenth example embodiment includes the features of the ninth example embodiment, wherein the plurality of atoms comprises Carbon, Hydrogen, Oxygen, and Nitrogen.

An eleventh example embodiment includes the features of the ninth example embodiment and comprises determining a sensed lambda adjustment or another sensed air-fuel ratio adjustment in response to the number of a plurality of atoms, and determining a stoichiometric air-fuel ratio parameter adjustment in response to the number of a plurality of atoms.

A twelfth example embodiment includes the features of the first example embodiment, wherein the act of determining one or more fuel properties comprises determining a molecular weight in response to the fuel composition constituents, and further comprising determining a charge mixture molecular weight parameter adjustment in response to the molecular weight.

A thirteenth example embodiment includes the features of the first example embodiment, wherein the act of determining one or more fuel properties comprises determining a gas constant in response to the fuel composition constituents and a ratio of specific heats in response to the fuel composition constituents, and further comprising determining a fuel control valve command adjustment in response to the gas constant and the ratio of specific heats.

A fourteenth example embodiment includes the features of the first example embodiment, wherein the act of determining one or more fuel properties comprises determining a thermal conductivity in response to the fuel composition constituents and determining a viscosity in response to the fuel composition constituents, and further comprising determining a sensed gas mass flow adjustment in response to the thermal conductivity and the viscosity.

A fifteenth example embodiment includes the features of the first example embodiment, wherein the non-transitory memory medium is configured with instructions executable by the processor to: determine a NOx emissions level configuration, and determine one or more commands in response to the NOx emissions level configuration.

A sixteenth example embodiment includes the features of the fifteenth example embodiment, wherein the non-transitory memory medium is configured with instructions executable by the processor to determine a NOx emissions level configuration at least in part in response to input received via the HMI.

A seventeenth example embodiment includes the features of the first example embodiment, wherein the non-transitory memory medium is configured with instructions executable by the processor to: determine an emissions control mode configuration, and provide combustion control logic to an electronic control system of an engine in response to the emissions control mode configuration.

An eighteenth example embodiment includes the features of the seventeenth example embodiment, wherein the non-transitory memory medium is configured with instructions executable by the processor to determine an emissions control mode configuration at least in part in response to input received via the HMI.

A nineteenth example embodiment includes the features of the first example embodiment, wherein the non-transitory memory medium is configured with instructions executable by the processor to: determine planned emissions control mode configuration, and adjust one or more parameters relating to the planned emissions control mode in response to the planned emissions control mode configuration.

A twentieth example embodiment includes the features of the first example embodiment, wherein the non-transitory memory medium is configured with instructions executable by the processor to determine planned emissions control mode configuration at least in part in response to input received via the HMI.

A twenty-first example embodiment includes the features of the first example embodiment, wherein the non-transitory memory medium is configured with instructions executable by the processor to: determine a start assist lambda parameter adjustment or another start assist air-fuel ratio parameter adjustment, and provide the start assist lambda parameter adjustment or the other start assist air-fuel ratio parameter adjustment to an electronic control system of an engine.

A twenty-second example embodiment includes the features of the twenty-first example embodiment, wherein the non-transitory memory medium is configured with instructions executable by the processor to determine the start assist lambda parameter adjustment or another start assist air-fuel ratio parameter adjustment in response to input received via the HMI, an input indicative of a methane constituent percentage of fuel provided to the engine, or both.

A twenty-third example embodiment includes the features of the first example embodiment, wherein the non-transitory memory medium is configured with instructions executable by the processor to: determine a warm-up assist lambda parameter adjustment or another warm-up assist air-fuel ratio parameter adjustment, and provide the warm-up assist lambda parameter adjustment or the other warm-up assist air-fuel ratio parameter adjustment to an electronic control system of an engine.

A twenty-fourth example embodiment includes the features of the twenty-third example embodiment, wherein the non-transitory memory medium is configured with instructions executable by the processor to determine the warm-up assist lambda parameter adjustment or another warm-up assist air-fuel ratio parameter adjustment in response to a sensed engine speed, and an input received via the HMI, an input indicative of a methane constituent percentage of fuel provided to the engine or both.

A twenty-fifth example embodiment includes the features of the first example embodiment, wherein the non-transitory memory medium is configured with instructions executable by the processor to: determine a plurality of adjustments including a NOx adjustment, an engine performance criterion adjustment, and a lambda parameter or other air-fuel ratio parameter adjustment, and provide the plurality of adjustments to an electronic control system of an engine.

A twenty-sixth example embodiment includes the features of the twenty-fifth example embodiment, wherein the non-transitory memory medium is configured with instructions executable by the processor to determine the plurality of adjustments in response to a sensed intake manifold absolute pressure, and an input received via the HMI, an input indicative of a methane constituent percentage of fuel provided to the engine or both.

A twenty-seventh example embodiment includes the features of the first example embodiment, wherein the non-transitory memory medium is configured with instructions executable by the processor to: determine a combustion control gain configuration, and provide the combustion control gain configuration to an electronic control system of an engine.

A twenty-eighth example embodiment includes the features of the twenty-seventh example embodiment, wherein the non-transitory memory medium is configured with instructions executable by the processor to determine the combustion control gain configuration at least in part in response to input received via the HMI.

A twenty-ninth example embodiment includes the features of the first example embodiment, wherein the non-transitory memory medium is configured with instructions executable by the processor to: determine an adjustment reset request condition, and reset one or more adjustments in response to the adjustment reset request condition.

A thirtieth example embodiment includes the features of the first example embodiment, wherein the non-transitory memory medium is configured with instructions executable by the processor to determine the adjustment reset request condition at least in part in response to input received via the HMI.

A thirty-first fifth example embodiment includes the features of the first example embodiment and comprises the HMI.

A thirty-second example embodiment includes the features of the first example embodiment, wherein the one or more engine controller adjustments comprises one or more of: an adjustment to perform a diagnostic or prognostic on the engine, an adjustment to output a warning, an adjustment to derate one or more of engine speed and engine torque, an adjustment to shut down the engine, and an adjustment to block the start of the engine.

A thirty-third example embodiment includes the features of the thirty-second example embodiment, wherein one or more of: the adjustment to output a warning comprises a fuel constituent based protection, a fuel property-based protection, or both, the adjustment to derate one or more of engine speed and engine torque comprises a fuel constituent based protection, a fuel property-based protection, or both, the adjustment to shut down the engine comprises a fuel constituent based protection, a fuel property-based protection, or both, the adjustment to perform a diagnostic or prognostic on the engine comprises a fuel constituent based protection, a fuel property-based protection, or both, and the adjustment to block the start of the engine comprises a fuel constituent based protection, a fuel property-based protection, or both.

A thirty-fourth fifth example embodiment is a method comprising operating the computer system according to first through thirty-third example embodiments to execute with the processor the instructions with which the non-transitory memory medium is configured.

A thirty-fifth example embodiment is a computer system comprising: a processor configured to receive input from a human-machine interface (HMI); and a non-transitory memory medium in operative communication with the processor and configured with instructions executable by the processor to perform one or more of the acts of: (a) determining a NOx emissions level configuration, and determining one or more commands in response to the NOx emissions level configuration; (b) determining an emissions control mode configuration, and providing combustion control logic to an electronic control system of an engine in response to the emissions control mode configuration; (c) determining planned emissions control mode configuration, and adjusting one or more parameters relating to the planned emissions control mode in response to the planned emissions control mode configuration; (d) determining a start assist lambda or other air-fuel ratio parameter adjustment, and providing the start assist lambda or other air-fuel ratio parameter adjustment to an electronic control system of an engine; (e) determining a warm-up assist lambda or other air-fuel ratio parameter adjustment, and providing the warm-up assist lambda or other air-fuel ratio parameter adjustment to an electronic control system of an engine; (f) determining a plurality of adjustments including a NOx adjustment, an engine performance criterion adjustment and a lambda or other air-fuel ratio parameter adjustment, and providing the plurality of adjustments to an electronic control system of an engine; (g) determining a combustion control gain configuration, and providing the combustion control gain configuration to an electronic control system of an engine; and (h) determining an adjustment reset request condition, and resetting one or more adjustments in response to the adjustment reset request condition.

A thirty-sixth example embodiment includes the features of the thirty-fifth example embodiment, wherein the non-transitory memory medium is configured with instructions executable by the processor to perform two or more perform two or more of the acts (a) through (h).

A thirty-seventh example embodiment includes the features of the thirty-fifth example embodiment, wherein the non-transitory memory medium is configured with instructions executable by the processor to perform three or more of the acts (a) through (h).

A thirty-eighth example embodiment includes the features of the thirty-fifth example embodiment, wherein the non-transitory memory medium is configured with instructions executable by the processor to perform four or more of the acts (a) through (h).

A thirty-ninth example embodiment includes the features of the thirty-fifth example embodiment, wherein the non-transitory memory medium is configured with instructions executable by the processor to perform five or more of the acts (a) through (h).

A fortieth example embodiment includes the features of the thirty-fifth example embodiment, wherein the non-transitory memory medium is configured with instructions executable by the processor to perform all of the acts (a) through (h).

A forty-first example embodiment includes the features of the thirty-fifth example embodiment, wherein in one or more of the acts (a) through (h) the determining is performed at least in part in response to input received via the HMI.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A computer system comprising:
   a processor configured to receive input from a human-machine interface (HMI); and
   a non-transitory memory medium in operative communication with the processor and configured with instructions executable by the processor to perform the acts of:
   determining fuel composition constituents, the fuel composition constituents indicating an amount of at least one of a plurality of molecules,
   determining one or more fuel properties in response to one or more fuel composition constituents, the one or more fuel properties indicating at least one physical property of the at least one of the plurality of molecules,
   determining one or more engine controller adjustments in response to at least one of the fuel composition constituents and the one or more fuel properties, the one or more engine controller adjustments adjusting at least one of a control command and a sensed value utilized in controlling an engine, and
   providing the one or more engine controller adjustments to an engine control system;
   wherein the one or more fuel properties comprise a gas constant and a ratio of specific heats of the fuel composition constituents, and the one or more engine controller adjustments comprises an adjustment to a fuel control valve command which controls the admission of gaseous fuel to the engine and which are determined in response to the gas constant and the ratio of specific heats.

2. The system of claim 1, comprising determining a fuel configuration indicating at least one of an input, a setting, and a rule to be used in determining fuel composition constituents.

3. The system of claim 2, wherein the act of determining fuel composition constituents is performed in response to the fuel configuration.

4. The system of claim 2, wherein the act of determining a fuel configuration is performed in response to input received via the HMI.

5. The system of claim 3, wherein the act of determining fuel composition constituents in response to at least the fuel configuration is further in response to one or both of a fuel methane percentage input and a fuel characterization selection input.

6. The system of claim 1, wherein the act of determining fuel composition constituents comprises determining an absolute or relative amount or proportion of one or more molecules.

7. The system of claim 1, wherein the act of determining one or more fuel properties comprises determining a lower heating value and a methane number in response to the fuel composition constituents.

8. The system of claim 7, comprising determining one or more of a spark timing command adjustment, an engine performance criterion command adjustment, and a lambda command or another air-fuel ratio command adjustment in response to one or both of the lower heating value and the methane number.

9. The system of claim 1, wherein the act of determining one or more fuel properties comprises determining a number of a plurality of atoms in response to the fuel composition constituents.

10. The system of claim 9, wherein the plurality of atoms comprises Carbon, Hydrogen, Oxygen, and Nitrogen.

11. The system of claim 9, comprising determining a sensed lambda adjustment or another sensed air-fuel ratio adjustment in response to the number of a plurality of atoms, and determining a stoichiometric air-fuel ratio parameter adjustment in response to the number of a plurality of atoms.

12. The system of claim 1, wherein the act of determining one or more fuel properties comprises determining a molecular weight in response to the fuel composition constituents, and further comprising determining a charge mixture molecular weight parameter adjustment in response to the molecular weight.

13. The system of claim 1, wherein the act of determining one or more fuel properties comprises determining a gas constant in response to the fuel composition constituents and a ratio of specific heats in response to the fuel composition constituents, and further comprising determining a fuel control valve command adjustment in response to the gas constant and the ratio of specific heats.

14. The system of claim 1, wherein the act of determining one or more fuel properties comprises determining a thermal conductivity in response to the fuel composition constituents and determining a viscosity in response to the fuel composition constituents, and further comprising determining a sensed gas mass flow adjustment in response to the thermal conductivity and the viscosity.

15. A process comprising:
   operating a computer system including a processor configured to receive input from a human-machine interface (HMI) and a non-transitory memory medium in operative communication with the processor and configured with instructions executable by the processor to perform the acts of:

determining fuel composition constituents, the fuel composition constituents indicating an amount of at least one of a plurality of molecules, determining one or more fuel properties in response to one or more fuel composition constituents, the one or more fuel properties indicating at least one physical property of the at least one of the plurality of molecules, determining one or more engine controller adjustments in response to at least one of the fuel composition constituents and the one or more fuel properties, the one or more engine controller adjustments adjusting at least one of a control command and a sensed value utilized in controlling an engine, and providing the one or more engine controller adjustments to an engine control system;

wherein the one or more fuel properties comprise a gas constant and a ratio of specific heats of the fuel composition constituents, and the or more engine controller adjustments comprises an adjustment to a fuel control valve command which controls the admission of gaseous fuel to the engine and which are determined in response to the gas constant and the ratio of specific heats.

16. The system of claim 15, wherein the act of determining one or more fuel properties comprises determining a number of a plurality of atoms in response to the fuel composition constituents.

17. The system of claim 16, wherein the plurality of atoms comprises Carbon, Hydrogen, Oxygen, and Nitrogen.

18. The system of claim 16, comprising determining a sensed lambda adjustment or another sensed air-fuel ratio adjustment in response to the number of a plurality of atoms, and determining a stoichiometric air-fuel ratio parameter adjustment in response to the number of a plurality of atoms.

19. The system of claim 15, wherein the act of determining one or more fuel properties comprises determining a molecular weight in response to the fuel composition constituents, and further comprising determining a charge mixture molecular weight parameter adjustment in response to the molecular weight.

20. The system of claim 15, wherein the act of determining one or more fuel properties comprises determining a gas constant in response to the fuel composition constituents and a ratio of specific heats in response to the fuel composition constituents, and further comprising determining a fuel control valve command adjustment in response to the gas constant and the ratio of specific heats.

21. The system of claim 15, wherein the act of determining one or more fuel properties comprises determining a thermal conductivity in response to the fuel composition constituents and determining a viscosity in response to the fuel composition constituents, and further comprising determining a sensed gas mass flow adjustment in response to the thermal conductivity and the viscosity.

* * * * *